Feb. 2, 1960     I. M. STEWART     2,923,224
AIR DISTRIBUTOR

Filed Nov. 20, 1956                              2 Sheets—Sheet 1

Inventor
Iain Maxwell Stewart

United States Patent Office 2,923,224
Patented Feb. 2, 1960

2,923,224

AIR DISTRIBUTOR

Iain Maxwell Stewart, Glasgow, Scotland, assignor to Thermotank Incorporated, Detroit, Mich., a corporation Application November 20, 1956, Serial No. 623,412

3 Claims. (Cl. 98—40)

This invention relates to improvements in air distributor devices.

An air distributor device according to the invention includes two apertured plates in series, at least part of one plate being spaced from the other plate, and one plate being adjustable relatively to the other in such wise as to provide for diffusion and variations in the direction of air flow through the distributor.

Two embodiments of the invention are illustrated schematically in the accompanying drawings in which.

Figure 1:
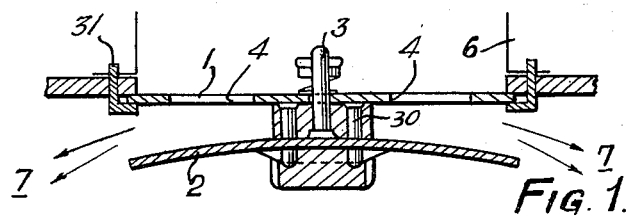
Figs. 1 and 3 are vertical axial sections illustrating different relative positions of the plates of the first embodiment.

Referring to Figs. 1 to 4 of the drawings, 1 denotes an upper circular apertured plate. 2 denotes a lower circular apertured plate in series with and spaced under the plate 1 and rotatably mounted on a central spring-urged plunger 3 carried by the plate 1. The plate 2 is of dished form. The plates 1, 2 are formed, respectively, with radial apertures 4, 5 of which the apertures 5 are larger than the apertures 4.

The device is fitted preferably at ceiling level to an air supply duct 6.

The device is attached to the air duct 6 by the angle members 31.

Figure 2:
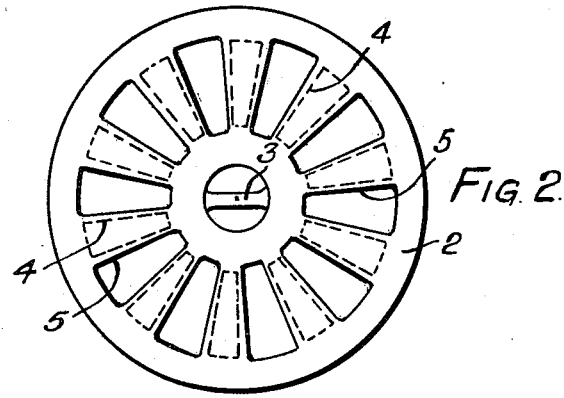
Figs. 2 and 4 are, respectively, plan views of the embodiment illustrated in Figs. 1 and 3.

In the position shown in Figs. 1 and 2, the apertures 4 are out of register with the apertures 5. Air streams issuing from the plate 1 impinge on the plate 2, thus producing a widely diffused lateral air stream, indicated by the arrows 7, from the space between the plates 1, 2.

Figure 3:
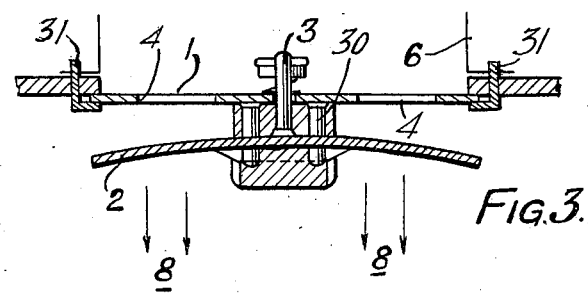
Figure 4:
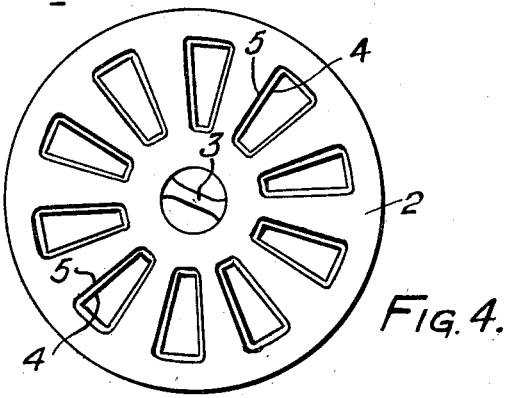

In the position shown in Figs. 3 and 4, the apertures 4, 5 are in register, the air stream issuing from the plate 1 passing through the apertures 5 in the plate 2, thus providing a downward air flow indicated by the arrows 8.

Figure 5:
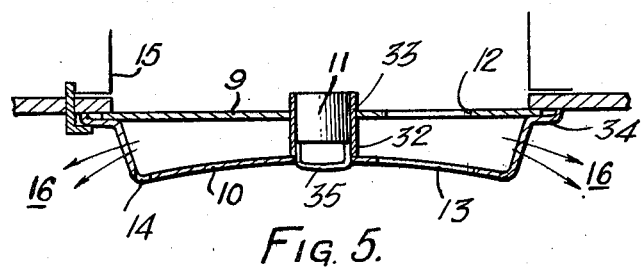
Fig. 5 is a vertical axial section.
Figure 6:
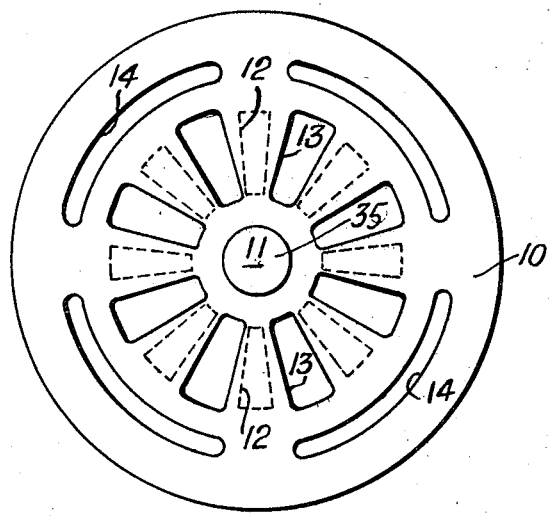
Fig. 6 is a plan view.

Referring to Figs. 5 and 6, 9 denotes a circular apertured plate. 10 denotes an apertured plate in series with and embracing the plate 9, the central part of the plate 10 being located under and spaced from the plate 9. 11 denotes a central spindle carried by the plate 9 and penetrating and projecting from the plate 10 to provide for rotatable adjustment of the plate 9 relatively to the plate 10.

The plates 9, 10 are formed, respectively, with radial apertures 12, 13 of which the apertures 13 are larger than the apertures 12. The peripheral edge portion of the plate 10 is formed with arcuate slots 14.

The device is fitted, preferably at ceiling level, to an air supply duct 15.

In the position shown in Figs. 5 and 6, the apertures 12 are out of register with the apertures 13. Air streams issuing from the plate 9 impinge on the plate 10, thus producing a diffused lateral stream, indicated by the arrows 16, flowing through the slots 14.

When the apertures 12, 13 are in register, the air stream issuing from the plate 9 passing through the apertures 13 in the plate 10, thus providing a downward air flow.

In both constructions, the plates are preferably of sheet plastic, but other materials may be used.

The lower plate 2 (Figs. 1 to 4) or the central part of the plate 10 (Figs. 5 and 6) may be flat, conical, or dished upwards or downwards, depending upon the degree of diffusion required.

The lower plate 2 is spaced from the upper plate 1 in Figs. 1 and 3 by the stud members 30.

In Fig. 5, the spacing is accomplished by the column member 32 which is welded at 33 to the plate 9, said plate having a rotatable sliding fit in the recess lip 34 of the lower member 10. The rotation of the plate 9 may be accomplished by application of a tool to the inverted knob member 35 which will turn the sleeve 32 and the plate 9.

Although a circularly shaped device has been described, it will be understood that the device may be of rectangular form. In this latter form, the apertures will be preferably parallel to one another, and the lower plate arranged to slide in a direction parallel to the long sides of the upper plate.

As is understood, most ordinary diffusing fittings are unsuitable for wall or bulkhead mounting, since the diffused stream can have an appreciable velocity in the position normally occupied by occupants of the space. With the device constructed as hereinbefore described, the diffusion is complete not far away from the device, or, alternatively, the jet is sufficiently concentrated to pass overhead.

What is claimed is:

1. In an air distributor including an air supply duct and an air distributor device fitted to the outlet of the air supply duct, the air distributor device comprising two apertured plates mounted in series in the direction of air flow through the outlet of the air supply duct, the first plate being circular and mounted directly over the outlet of the air supply duct so that the air from the air supply duct flows through the apertures of the first of the two plates, said plates being spaced apart to provide for the flow of air delivered through the apertures of the first plate laterally along the second plate in series, means supporting the second plate below the first plate, rotatable bearing means between and connected to said plates for rotatably adjusting one of the plates relative to the other plate, the apertures in said plates being in register when the plates are in one position of relative rotation with respect to each other for the flow of air from the air duct in series through the apertures in the plates and the apertures in the plates being out of register with each other when the plates are in another position of relative rotation with respect to each other whereby the air flowing from the air duct through the apertures of the first plate is directed laterally between the plates and across the surface of the second plate in the series.

2. An air distributor as claimed in claim 1, in which the apertures in the two plates extend radially and are of substantially the same shape, the apertures in the second plate being larger than the apertures in the first plate.

3. An air distributor as claimed in claim 1, in which the second plate of the series includes a peripheral wall portion extending from the main body of the second plate to the periphery of the first plate, said peripheral wall portion of the second plate being provided with slots through which air flowing along the surface of the second plate flows when said apertures of the plates are out of register with respect to each other.

References Cited in the file of this patent

UNITED STATES PATENTS

| 1,517,434 | Kluever | Dec. 2, 1924 |
| 2,398,938 | Honerkamp | Apr. 23, 1946 |
| 2,470,488 | Honerkamp et al. | May 17, 1949 |

FOREIGN PATENTS

| 477,512 | Great Britain | Dec. 31, 1937 |
| 741,505 | Germany | Nov. 12, 1943 |
| 647,816 | Great Britain | Dec. 20, 1950 |
| 686,005 | Great Britain | Jan. 14, 1953 |